(12) United States Patent
Steingass et al.

(10) Patent No.: US 7,418,770 B2
(45) Date of Patent: Sep. 2, 2008

(54) APPARATUS FOR SECURING A COUPLING OR A FITTING TO A SPIRAL BEAD HOSE

(75) Inventors: Robert W. Steingass, Valparaiso, IN (US); Alexander C. Yovanovich, Valparaiso, IN (US)

(73) Assignee: Task Force Tips, Inc., Valparaiso, IN (US)

( * ) Notice: Subject to any disclaimer, the term of this patent is extended or adjusted under 35 U.S.C. 154(b) by 377 days.

(21) Appl. No.: 11/104,848

(22) Filed: Apr. 13, 2005

(65) Prior Publication Data

US 2006/0232063 A1    Oct. 19, 2006

(51) Int. Cl.
*F16L 3/137* (2006.01)
*F16L 33/00* (2006.01)

(52) U.S. Cl. ..................... 24/16 R; 24/16 PB; 285/252; 285/254

(58) Field of Classification Search ................ 285/252, 285/253, 254, 154.2, 154.3, 154.4; 138/122, 138/135, 136; 24/16 R, 16 PB, 30.5 R
See application file for complete search history.

(56) References Cited

U.S. PATENT DOCUMENTS

| | | | | |
|---|---|---|---|---|
| 1,802,572 A | * | 4/1931 | Phillips | 285/249 |
| 1,805,174 A | * | 5/1931 | Gudka | 55/374 |
| 1,844,148 A | * | 2/1932 | Dunwoodie | 285/253 |
| 2,187,873 A | * | 1/1940 | Bratz | 138/130 |
| 2,858,147 A | * | 10/1958 | Guarnaschelli | 285/222.5 |
| 3,596,936 A | * | 8/1971 | Dieckmann et al. | 285/222.1 |
| 4,045,843 A | * | 9/1977 | Loose et al. | 24/16 PB |
| 4,273,367 A | * | 6/1981 | Keeney et al. | 285/419 |
| 4,392,678 A | | 7/1983 | Adamczyk | |
| 4,483,556 A | * | 11/1984 | LiVolsi | 285/252 |
| 4,524,997 A | | 6/1985 | Ebert | |
| 4,680,834 A | * | 7/1987 | Andre et al. | 24/16 PB |
| 4,735,235 A | * | 4/1988 | Anderson et al. | 138/109 |
| 4,735,387 A | * | 4/1988 | Hirano et al. | 248/71 |
| 4,903,996 A | * | 2/1990 | Herr | 285/39 |

(Continued)

*Primary Examiner*—James M Hewitt
(74) *Attorney, Agent, or Firm*—Maginot, Moore & Beck LLP

(57) ABSTRACT

The present invention relates to an apparatus for securing couplings or fittings to the ends of hose of the type that has a smooth cylindrical interior and a spiral-reinforcing bead in conjunction with a more flexible hose body. The present invention relates to a segmented binding strip that is molded or cast in a generally opened or flat condition and is subsequently wrapped around the hose thus forming a generally cylindrical shape to fit the circumference of the hose when installed. Each segment is relatively rigid but is articulated or hinged to adjacent segments with a thinner hinge section allowing the entire binding strip to be bent in a circular form as it is wrapped around the hose. Once wrapped around the hose the binding strip is secured or bound to retain the coupling or fitting to the hose. The binding strip segments have a surface on the hose side that is shaped to mate with the undulations of the spiral bead hose, while the opposite or exterior surface of the binding strip forms a relatively smooth surface for clamping and may include one or more clamping tracks to engage a clamp. The end segments may include an overlap feature to allow for variations in hose diameter. A V-shaped seal may be used between the coupling or fitting and the interior of the hose to prevent leakage of either vacuum or pressure.

37 Claims, 20 Drawing Sheets

U.S. PATENT DOCUMENTS

| | | | |
|---|---|---|---|
| 4,907,830 A * | 3/1990 | Sasa et al. | 285/91 |
| 5,224,244 A * | 7/1993 | Ikeda et al. | 24/16 PB |
| 5,430,252 A * | 7/1995 | Petersen | 174/665 |
| 6,195,865 B1 | 3/2001 | Kirik, Jr. | |
| 6,581,984 B1 * | 6/2003 | Seung-Kyu | 285/368 |
| 6,659,510 B1 * | 12/2003 | Ikegami et al. | 285/243 |
| 7,240,930 B2 * | 7/2007 | Stravitz | 285/419 |
| 2004/0195834 A1 | 10/2004 | Steingass et al. | |
| 2006/0006651 A1 * | 1/2006 | Watanabe | 285/903 |
| 2007/0028426 A1 * | 2/2007 | Laporte | 24/16 PB |

\* cited by examiner

APPARATUS FOR SECURING A COUPLING OR A FITTING TO A SPIRAL BEAD HOSE

BACKGROUND OF THE INVENTION

The present invention relates to rigid hoses, and namely to hoses that remain in a generally round shape which can be used for either pressure or suction service, as opposed to hoses that lay flat for storage and become round when pressure is applied. The present invention relates especially to hoses having a spiral bead or helical rib protruding from their exterior and more particularly concerns an apparatus for securing couplings or fittings to the ends of a spiral bead hose.

Spiral bead hoses provide a fluid connection from a source, such as a pond, to a destination such as a pump. For example, spiral bead hoses may be used for drafting water at the site of a fire. Spiral bead hoses are frequently used in applications involving low pressure or vacuum use, for which the flat, expandable type of hose is inadequate. In these applications, the hose must be rigid to maintain a flow path and yet flexible enough to turn and bend to easily conform to the route from the source to the destination.

Spiral bead hoses are made by simultaneously extruding two or more materials in a helical manner so that the materials are bonded to one another while they are extruded. The extrusion is revolved to form a hose whereby each revolution is joined with the previous to form a continuous hose. Spiral bead hoses generally have both a softer un-reinforced cylindrical body for flexibility and a rigid spiral reinforcing bead which maintains the cylindrical shape.

Spiral bead hoses are often extruded from a plastic, such as PVC plastic which is lighter and less costly than reinforced rigid rubber hose. Another benefit of the extruded hose is that it can be made of a clear material to provide a view of water flow, especially when priming the water pump. A further benefit is that the extruded hose presents a smooth inner bore, which allows for unrestricted water flow through the hose. The helical bead helps prevent ballooning of the body of the hose, resists abrasion and helps the hose resist damage when impacted. Spiral bead hoses are well known in the industry and include the Tigerflex® hose by Kuriyama or America Inc., as well as various hoses made by the Kanaflex Corporation, such as their series 100CL.

In use, spiral bead hoses are provided with fittings or couplings at the opposite ends that are configured to supply liquid from a water source to a pump inlet. Most couplings or fittings include a leak free engagement feature to a mating connector, such as male or female threads sealed with a hose gasket. Moreover, most couplings or fittings are formed of a rust-resistant material, such as brass or aluminum.

While the spiral bead hose design provides significant advantages as a suction hose, the spiral design poses problems for securing couplings and fittings to the hose. More particularly, it has been difficult to provide a leak free connection between the hose and the fitting. It has also been difficult to secure the hose from slipping off the fitting under the influence of fluid pressure.

In one approach, the hose is secured to standard hose barb type fittings using U-shaped rods with threaded ends passing through a mounting plate on the outside of the hose. Nuts are tightened down on the threaded ends of the rod to pull the U-shape into tension, thereby compressing the hose against a fitting. The rods are sized to fit within the gaps between the helical bead portions. Even when the U shaped rod wraps more than one turn around the helix of the hose leakage can happen from a spiral void under the bead because the tension rod does not compress the bead. Moreover, the threaded ends of the rods project significantly away from the mounting plate and the hose, making them susceptible to snagging other equipment or workers, or to damage when the fire hose is dragged along the ground.

In another approach a helical banding coil is placed in the gaps between the helical bead portions to provide a smooth surface for banding. The banding does not compress the coil against the bead, so leakage can happen from a spiral void under the bead.

In either of these prior approaches the raised hose barb cannot uniformly impress into sealing engagement in the hose given the spiral nature of the rigid reinforcing bead which must pass across the barb at some point. Retaining spiral bead hose onto standard hose barb fittings using these approaches is difficult because fluid pressure tends to make the rigid bead progressively walk off of the barb.

In another approach, the hose is secured to the fitting with a split two-piece collar with screws spanning the splits. The collar has a spiral form that engages the spiral hose as well as a groove that engages a rib on the tailpiece fitting. The screws are tightened to partially close the splits, thereby compressing the hose against a cylindrical tailpiece extending into the hose, while a rib engages a groove in the collars to retain the collar to the fitting. This approach can solve the retention problem; however, the two-piece collar is of a fixed circumference that is not adapted to compensate for diameter variations of the hose. It has been found that a water-tight seal with this type of collar often requires the use of caulking.

There is a significant need for an apparatus for securing couplings and fittings to a spiral bead hose. It is important that the apparatus provide a leak free seal without compromising the integrity of the hose.

SUMMARY OF THE INVENTION

To address this need, the present invention provides an apparatus for securing fittings or couplings to a flexible hose, and particularly to a hose having an outer helical or spiral bead. In one aspect of the invention, the apparatus includes a binding strip with a hose engagement surface and an opposite outer surface.

In accordance with one aspect of the invention, an apparatus is provided for securing a fitting or coupling to a hose having a spiral or helical bead on its outer surface, in which the fitting or coupling has a cylindrical portion configured for insertion into the end of the hose. The apparatus comprises an elongated binding strip having an inner surface for contacting the hose and an opposite outer surface, the outer surface defining at least one groove along the length of the strip. The inner surface includes a plurality of rib segments, adjacent ones of the rib segments connected by a hinge segment so that the rib segments bend about the hinge segments when the binding strip is wrapped around the hose. The apparatus further comprises at least one tension element configured to be wrapped around the binding strip within the at least one groove when the binding strip is wrapped around the hose.

In the preferred embodiment, the at least one tension element is a band clamp. Preferably, two band clamps are provided adjacent each side edge of the binding strip. The band clamp includes a tension band and a buckle. In accordance with one feature, the outer surface of the binding strip includes a recess for receiving the buckle therein when the tension band is wrapped around the binding strip. The outer surface may also define upstanding ribs adjacent the recess substantially surrounding the buckle when the buckle is within the recess.

In accordance with certain features of the invention, at least some of the plurality of rib segments include opposite ribs extending transversely across the binding strip, whereby the ribs contact the hose when the binding strip is wrapped therearound. The plurality of rib segments define at least one groove configured to receive the spiral bead of the hose therein when the binding strip is wrapped around the hose. Preferably, the rib segments define at least two grooves so that the binding strip encompasses at least two convolutions of the spiral bead. To accommodate the spiral bead, grooves are arranged at an angle relative to the length and transverse dimension of the binding strip to correspond to the spiral configuration of the bead on the hose.

In some embodiments of the binding strip, at least some of the plurality of rib segments includes at least one cavity defined between the opposite ribs. In some embodiments, only one cavity is provided between the opposite ribs. This single cavity may open at one edge of the binding strip. In other embodiments, a cavity on both sides of the each groove configured to receive the spiral bead.

In order to assist in indexing and positioning the binding strip relative to the cut end of the hose, an endmost one of the rib segments may include an enlarged rib configured to engage the cut end of the spiral bead of the hose. To further assist in indexing and retaining the binding strip relative to the fitting or coupling, the binding strip may define a channel extending along the length of the binding strip through each of the plurality of rib segments. The channel is configured to receive a retainer rib formed in the fitting or coupling when the binding strip is wrapped simultaneously around the hose and a portion of the fitting or coupling.

In a further aspect of the invention, the binding strip includes opposite ends configured to overlap when the binding strip is wrapped around the hose. The opposite ends preferably include substantially flat facing surfaces when the opposite ends are overlapped. The facing surfaces are configured so that the overall circumference of the binding strip may be varied to account for variations in the hose diameter, while still providing continuous contact around the circumference. In some embodiments, the binding strip includes a positive fixation element between the facing surfaces at the opposite ends thereof. The positive fixation element may includes a screw, a screw bore through one of the opposite ends for passage of the machine screw therethrough, and a threaded bore defined in the other of the opposite ends configured to threadedly receive the machine screw. The positive fixation element may alternatively include a snap-fit arrangement between the opposite ends.

In a further aspect of the invention, the binding strip is preferably molded from plastic. In one preferred embodiment, the binding strip includes several rib segments separated by hinge segments. In another embodiment, the binding strip includes three or four discrete arc segments that combine to form a continuous circumference around the hose.

Where a fluid-tight attachment is desired, the apparatus may further comprise a groove defined in the cylindrical portion of the fitting or coupling, the groove having a depth and a width and a V-shaped circumferential seal configured to fit within the groove. The seal has an undeformed width less than the width of the groove and an undeformed height greater than the height of the groove. The seal is deformable when the cylindrical portion is inserted into the end of the hose so that the seal has a deformed width greater than the undeformed width and a deformed height less than the undeformed height. In the preferred embodiment, the seal is deformable so that the deformed width equals the width of the groove.

In a further aspect of the invention, a binding strip is provided for securing a fitting or coupling to a hose having a spiral or helical bead on its outer surface, the fitting or coupling having a cylindrical portion configured for insertion into the end of the hose. The binding strip comprises an elongated body having an inner surface for contacting the hose and an opposite outer surface, the outer surface defining at least one groove along the length of the strip configured to receive a band clamp. The inner surface includes a plurality of rib segments, adjacent ones of the rib segments connected by a hinge segment so that the rib segments bend about the hinge segments when the binding strip is wrapped around the hose.

It is one object of the invention to provide a means or securing a fitting or coupling to a hose, and more particularly a hose having a spiral or helical bead defined on the outer surface of the hose. Another object is to provide a securing means that can achieve a fluid or water-tight seal between the hose and the fitting or coupling.

One benefit of the present invention is that is provides a means for securing that is easy to assemble on a hose. Another benefit is that the invention presents a minimal profile relative to the outside of the fitting or the hose so that there is nothing to snag when the hose is being used.

Other objects and benefits of the invention will become apparent upon consideration of the following written description and accompanying figures.

DESCRIPTION OF THE PREFERRED EMBODIMENTS

Figure 1:
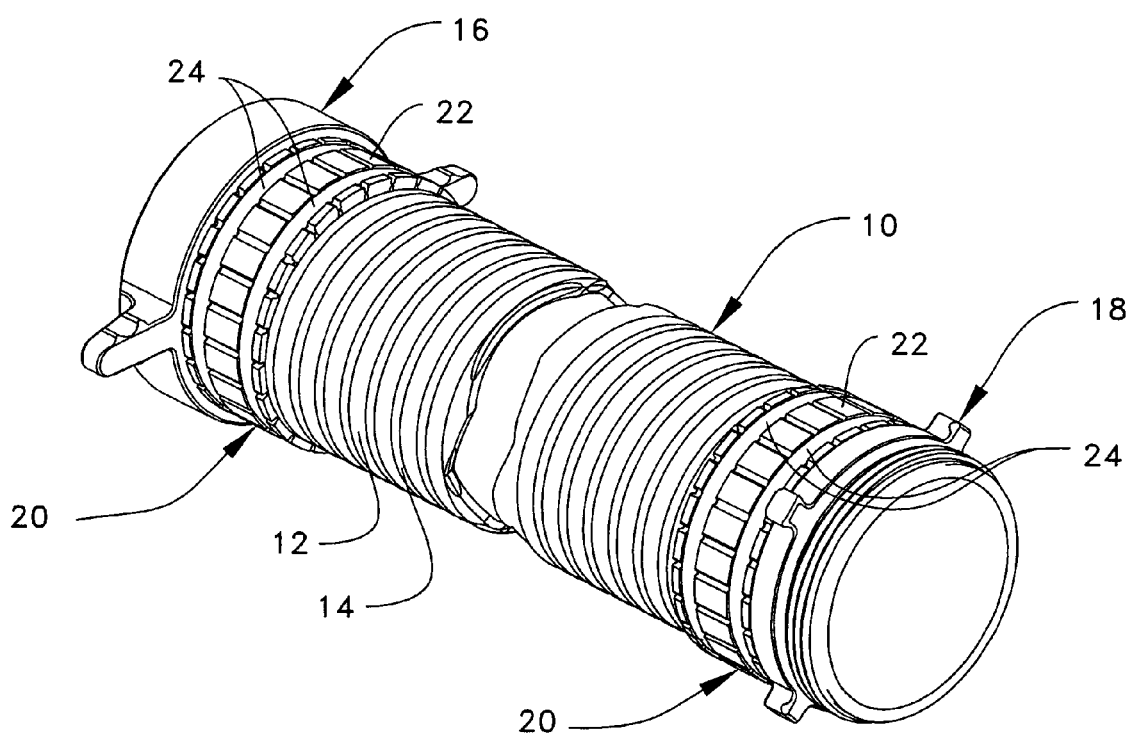
FIG. 1 a perspective view of opposite ends of a suction spiral bead hose with couplings secured thereto by a binding strip assembly according to one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention contemplates an apparatus for securing a coupling or fitting to the end of a flexible hose, and more particularly to an extruded hose having a helical or spiral bead. Typically, the spiral bead hose is continuously extruded and then cut to a desired length. Couplings or fittings are secured to the ends of the extruded hose to form the final spiral bead hose. The apparatus of the present invention is preferably used to assemble a spiral bead hose, but may also be adapted for use in the field. For instance, when a hose is damaged, it is possible to dissect out the damaged section and then re-connect the separated hose portions with an intermediate coupling. The apparatus of the present invention may be used to secure this intermediate coupling to the repaired hose.

Figure 12:
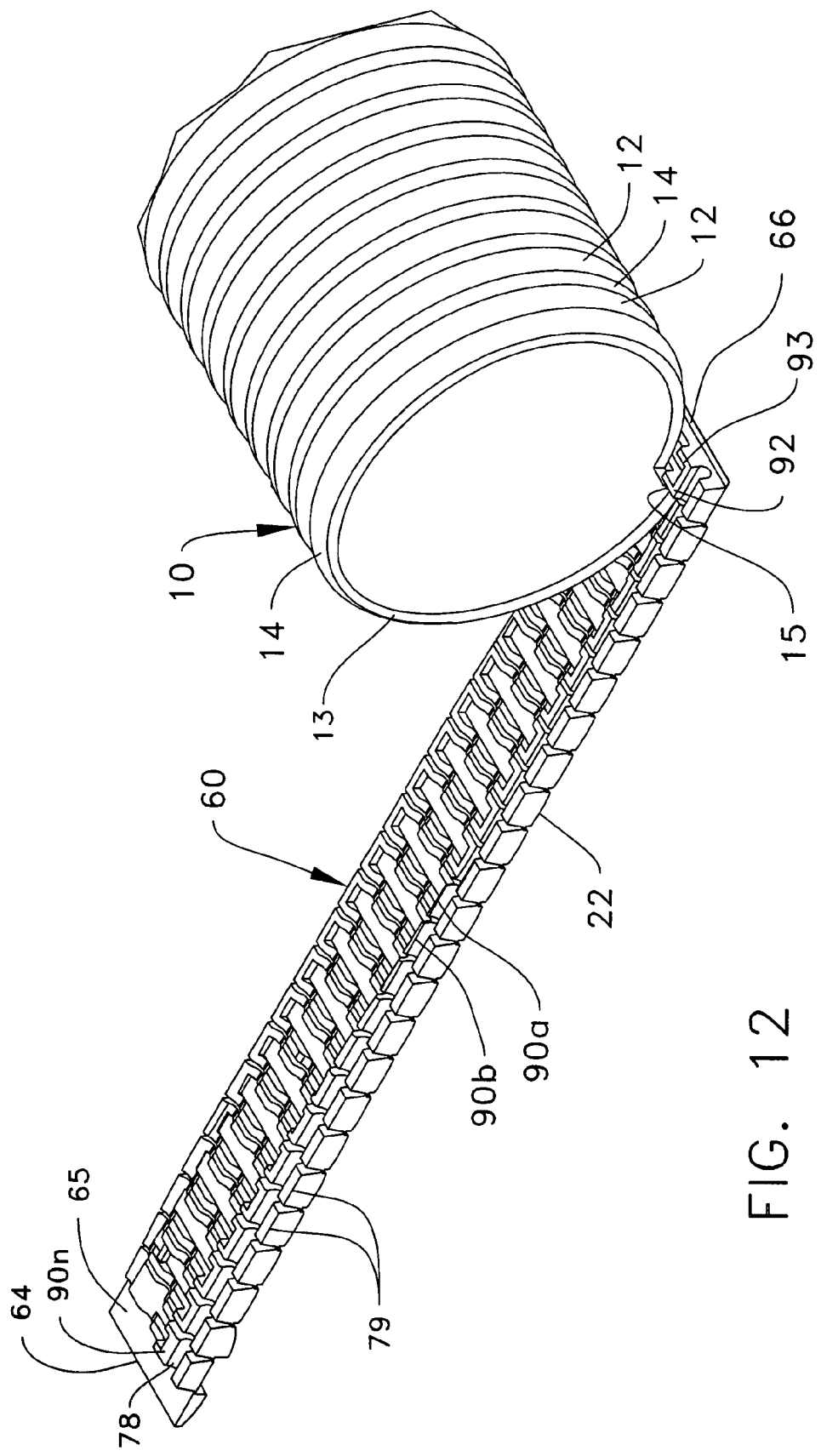
FIG. 12 is a perspective view of an end of the spiral bead hose with the binding strip in a first step for wrapping the strip around the hose.

As shown in FIG. 1, a spiral bead hose 10 includes a hose body 12 with a helical or spiral bead or rib 14 formed on the outer surface of the body. The hose body 12 preferably has a smooth cylindrical interior. The ends of the hose are sliced or cut through the body 12, forming the body edge 13, to avoid having to cut through the length of thicker bead 14. However, at some point it is necessary to cut across the bead, which results in an exposed bead end 15 (FIG. 12). As explained in more detail herein, this bead end serves to orient or index the securement apparatus in certain embodiments of the present invention.

The spiral bead hose 10 further includes couplings or fittings 16, 18 at the opposite ends of the hose. In the illustrated hose 10, one coupling 16 is configured for engagement to a water source fitting, such as a suction strainer. The opposite coupling 18 is configured for connection to the pumping engine. Of course, other types of couplings or fittings may be secured to the spiral bead hose with the apparatus of the present invention.

Figure 2:
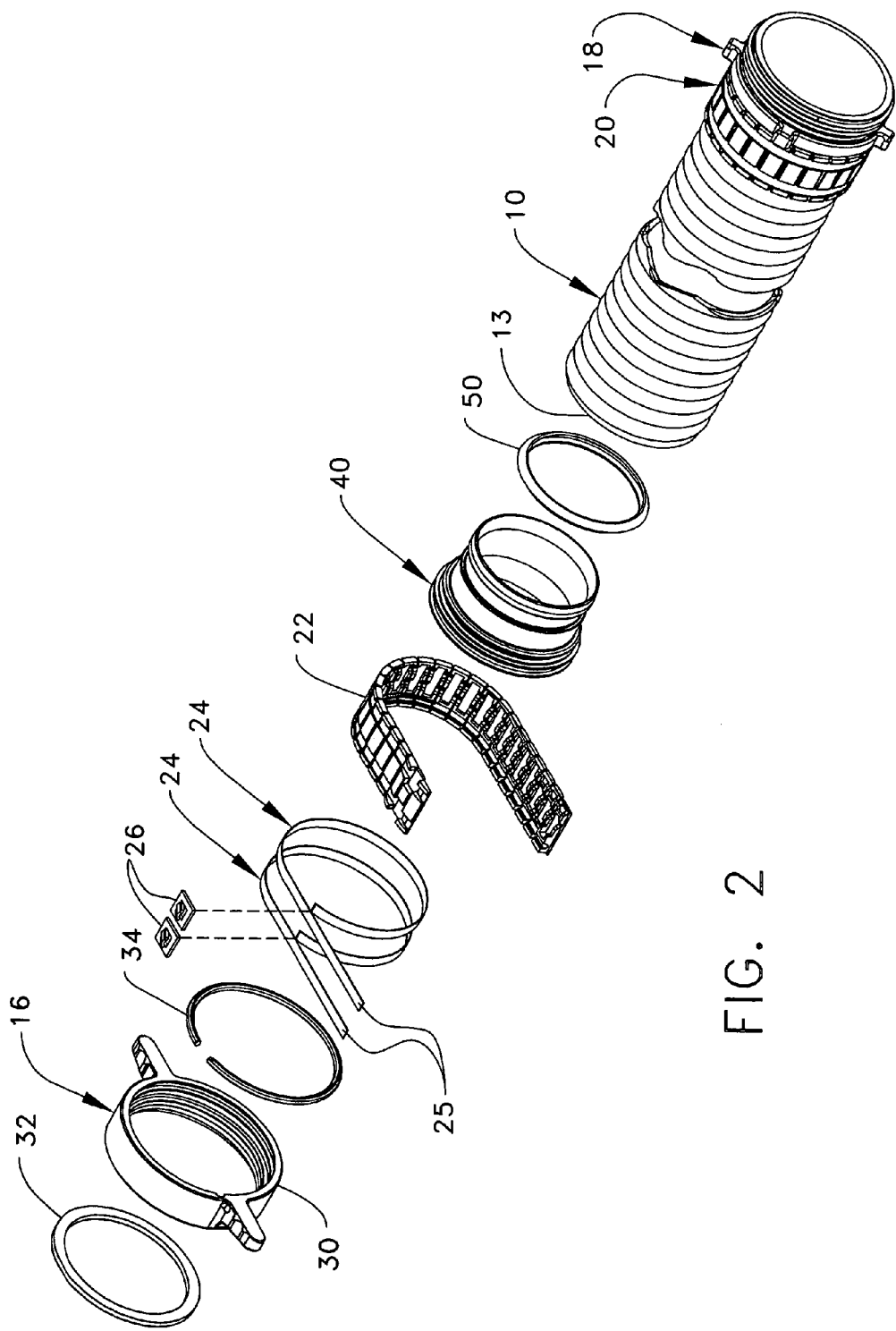
FIG. 2 is a partially exploded view of the binding strip assembly and coupling at one end of the spiral bead hose shown in FIG. 1.

In one example, shown in the exploded view of FIG. 2, the coupling 16 includes a coupling ring 30 that carries internal threads for mating with a male threaded fitting of the pump inlet, mating hose, valve or fitting. The coupling ring 30 is supported on a tailpiece 40 that interfaces with the spiral bead hose 10. The ring may be held in place on the tailpiece by a bearing strip 34, which may be constructed as described in co-pending patent application Ser. No. 10/406,883, entitled "Fluid Joint Between Fire Equipment and Connector", and which was published as Ser. No. 2004/0195834 on Oct. 7, 2004. A gasket 32 creates a fluid-tight seal between the tailpiece and a mating male threaded fitting (not shown).

Figure 3:
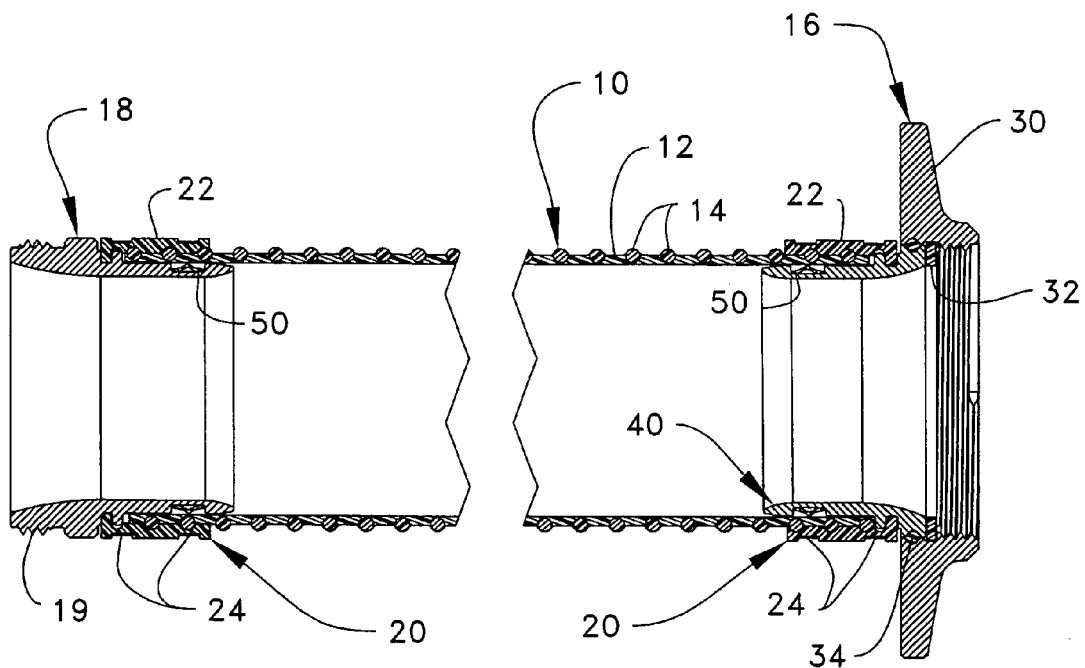
FIG. 3 is a cross-sectional view of the spiral bead hose depicted in FIG. 1.
Figure 4:
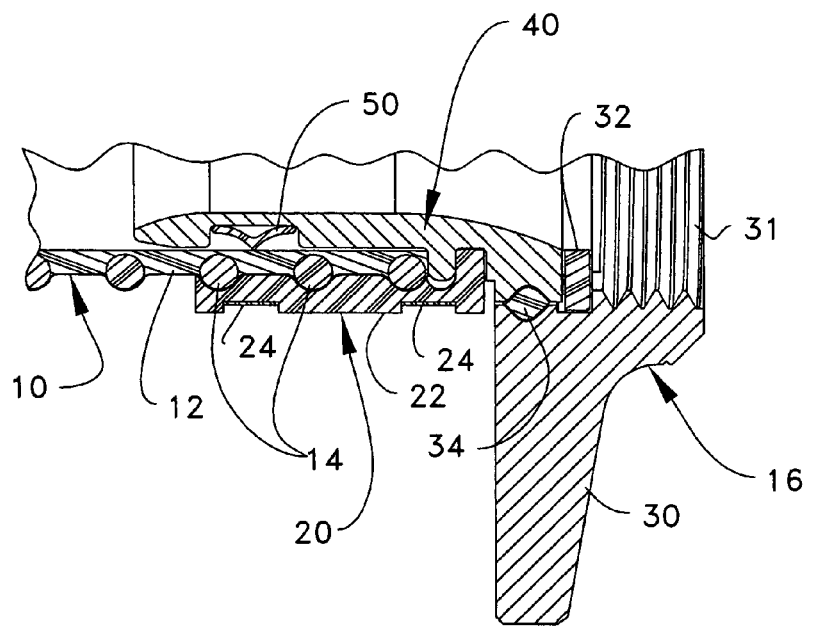
FIG. 4 is an enlarged cross-sectional view of one end of the spiral bead hose illustrated in FIG. 1 showing the coupling and binding strip assembly of the present invention.

In accordance with the present invention, a securement apparatus or binding strip assembly 20 secures the spiral bead hose to the tailpiece. As shown in FIGS. 2-4, the assembly 20 includes a binding strip 22 sized to encircle the outside of the hose 10. The binding strip 22 is held in place by a number of band clamps 24, each including a band 25 and a buckle 26. The band clamps depicted in the figures and described herein are only intended to be exemplary. For the purposes of the present invention, the band clamps 24 may be of several constructions intended for use on flexible hoses. However, it is preferred that the band clamps exhibit a minimal profile or protrude above the surface of the binding strip 22 as little as possible.

Figure 5:
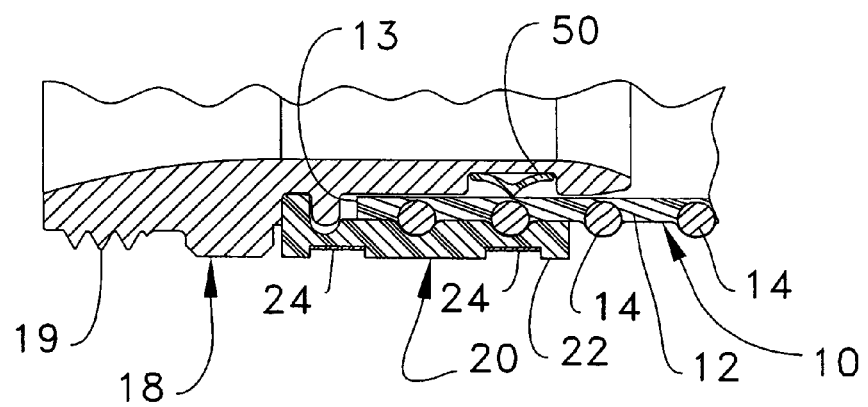
FIG. 5 is an enlarged cross-sectional view of the opposite end of the spiral bead hose illustrated in FIG. 1 showing the coupling and binding strip assembly of the present invention.

A similar construction may be implemented at the opposite end of the hose 10 to secure the coupling 18 to the hose, as shown in FIG. 5. In this case, the coupling itself engages the hose 10 and incorporates the features of the tailpiece 40. The coupling 18 also includes its own mating features, such as threads 19, configured to permit engagement to other hoses, valves or fittings.

Figure 13:
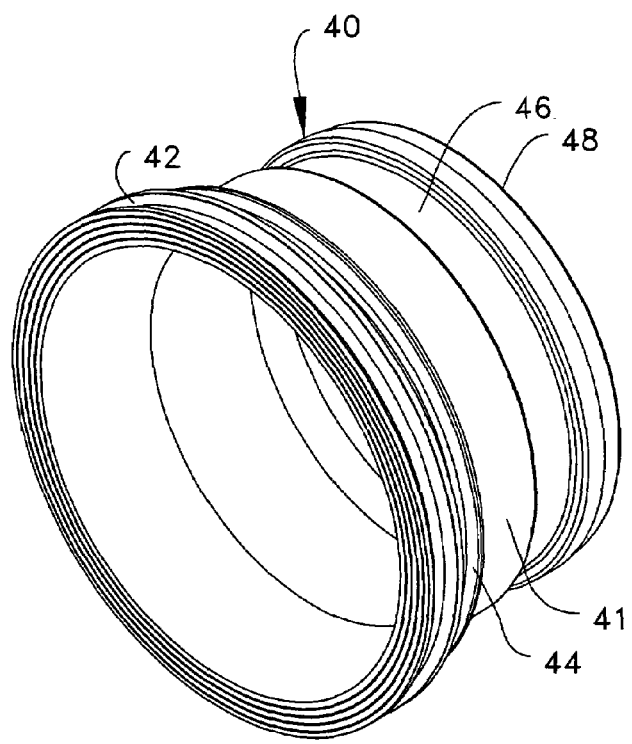
FIG. 13 is a perspective view of a tailpiece that forms part of a hose end coupling.
Figure 14:
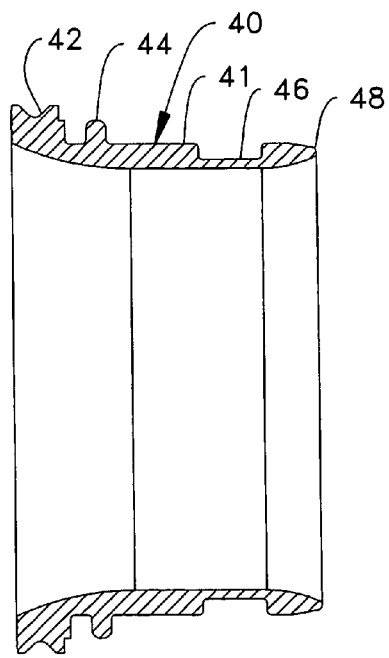
FIG. 14 is a side cross-sectional view of the tailpiece shown in FIG. 13.

Details of one type of tailpiece 40 are shown in FIGS. 13-14. The outer surface 41 of the tailpiece defines an insertion end 48 that is adapted to fit within the inner diameter of the hose 10. Preferably, the insertion end 48 is slightly tapered and may define a barb at its inboard edge to prevent retrograde movement of the tailpiece from the hose. The outer surface 41 further defines an outward opening channel 42 that cooperates with the bearing strip 34 to hold the coupling 16 to the tailpiece.

A circumferential retainer rib 44 is preferably formed adjacent one end of the tailpiece for engagement with the binding strip 22 as described below. The outer surface 41 of the tailpiece 40 also defines a circumferential groove 46 that receives a novel seal 50 (FIGS. 2-5) that cooperates with the tailpiece and hose body to form a water-tight seal.

Figure 15:
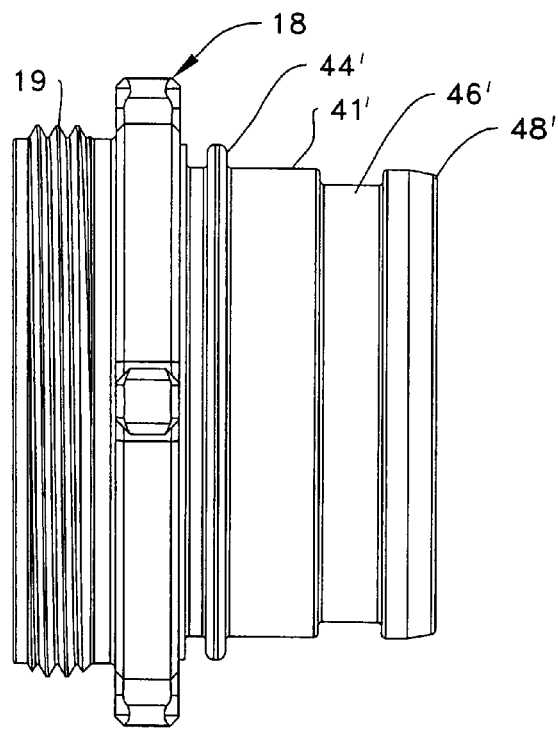
FIG. 15 is a side elevational view of a coupling for an end of the spiral bead hose.

The coupling 18 incorporates a similar structure as the tailpiece, as shown in FIG. 15. Thus, the coupling 18 includes an outer surface 41' that defines an insertion end 48', a circumferential groove 46' for receiving a seal 50, and a retainer ring 44'.

Details of one embodiment of the binding strip of the present invention can be seen in FIGS. 7-11. The strip 22 of this embodiment is preferably formed of a flexible, yet resilient material. The material must also have sufficient tensile strength to resist stretching when the strip is placed in tension around the hose. In a specific embodiment, the strip is molded from of a plastic such as polyethylene, polypropylene or nylon. The strip may also be cast from a metal, such as zinc or aluminum. In the preferred embodiment, the strip is molded from DuPont Zytel® ST801AHS BK010 black nylon. As will become apparent from the following description, the strip 22 is particularly suitable for injection molding.

The strip 22 has a hose engagement surface 60 (FIG. 7) that faces and engages the outer surface of the hose 10. The opposite outer surface 62 (FIG. 8) defines at least one, and preferably two, grooves 69 that are sized to receive the band 25 of the band clamps 24. Thus, the grooves 69 preferably have width and depth dimensions that are slightly greater than the comparable dimensions of the bands 25 so that the bands will remain nestled within the grooves. This feature prevents the bands from snagging when the hose is assembled or used.

Figure 8:
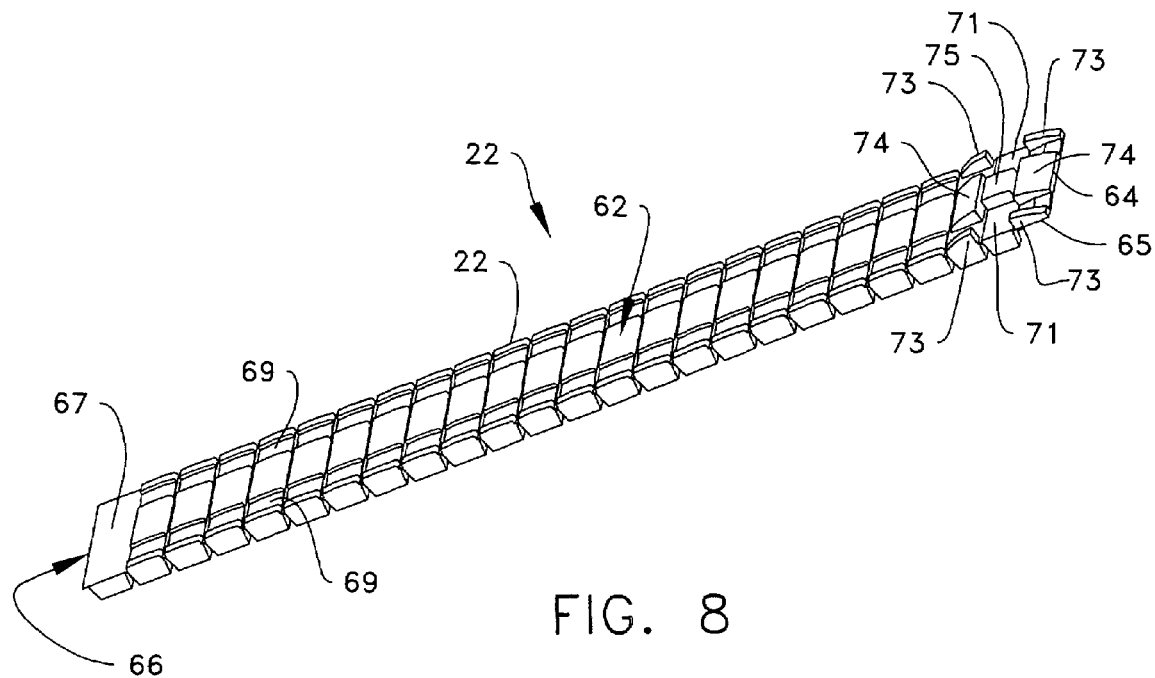
FIG. 8 is a perspective view of the outer side of the binding strip shown in FIG. 8.
Figure 10:
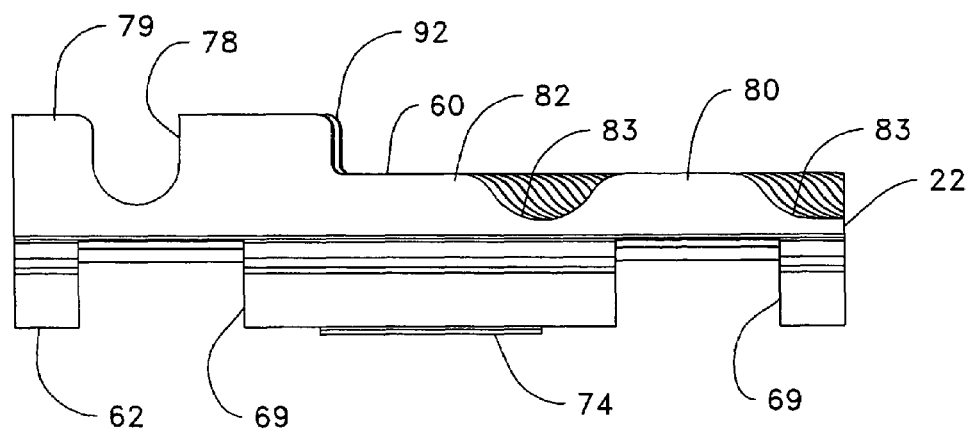
FIG. 10 is an end elevational view of the binding strip illustrated in FIG. 7.

Similarly, as shown in FIG. 8, the outer surface 62 of the binding strip 22 is configured to also protect or hide the buckle 26 of the band clamps 24 when the clamps are tightened. Thus, one end of each of the band grooves 69 defines an enlarged buckle recess 71 that is sized slightly larger than the buckle 26. The buckles are flanked by protector ribs 73 on the outer side edges, and ribs 74 and 75 in the space between the two band grooves. It can be seen from FIG. 8 that the buckle recesses 71 are open to the sides of the binding strip to facilitate access to the buckles when the band clamps are being tightened. Outside of that limited access, the buckles are wholly contained by the protector ribs 73-75 so that the buckles cannot snag and possibly loosen.

In the illustrated embodiment, the band clamps 24 are depicted as the band and buckle type clamp. This type of clamp exerts a uniform pressure when the band is tightened around the hose. Each band 25 is threaded through a corresponding buckle 26 and the buckle is typically crimped or punched to mechanically fix the buckle and band together. The band clamps are preferably the stainless steel product manufactured by Clamps (Asia) Pte. Ltd. under the name Ultra-Lok®. Other materials or types of band or hose clamps may be used instead of the band clamps 24 described in connection with the preferred embodiment. It is therefore contemplated that the outer surface 62 of the binding strip would be modified accordingly to accept the different hose clamp. It is preferable that the protector ribs be retained regardless of the type of hose clamp used, for the reasons expressed above.

Figures 19A, 19B:
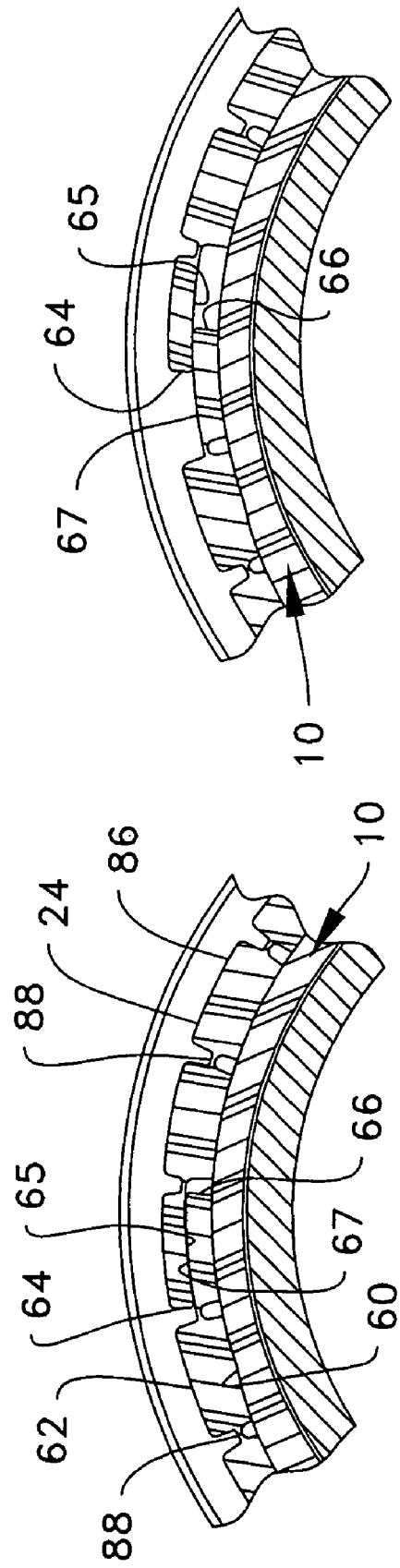
FIGS. 19a-b are end partial cross-sectional views of a lap joint portion of the binding strip in accordance with one embodiment of the present invention.

Returning to FIG. 7, the hose engagement surface 60 is configured to provide a snug fit around the hose 10, including the helical bead 14, when the band clamps 24 are tightened around the binding strip 22. It can first be noted that the binding strip is configured to accept different hose diameters. It is known that spiral bead hoses may be extruded with diameter variations that produce variations in the circumference on the order of ½ inches. In order to address this issue while still retaining full contact around the entire circumference of the spiral bead hose, the binding strip includes an overlapping end 64, with an overlapping surface 65, and an overlapped end 66, with an overlapped surface 67. As best shown in FIGS. 19a, b, the end 64 overlays or overlaps the end 66, with the end 66 in complete contact with the outside of the hose. A comparison of FIG. 19a with FIG. 19b shows that the amount of overlap between surfaces 65 and 67 may change as the diameter of the hose 10 changes. It is preferably that the two ends 64, 66 overlap by at least about ¼ inches.

Figure 18:
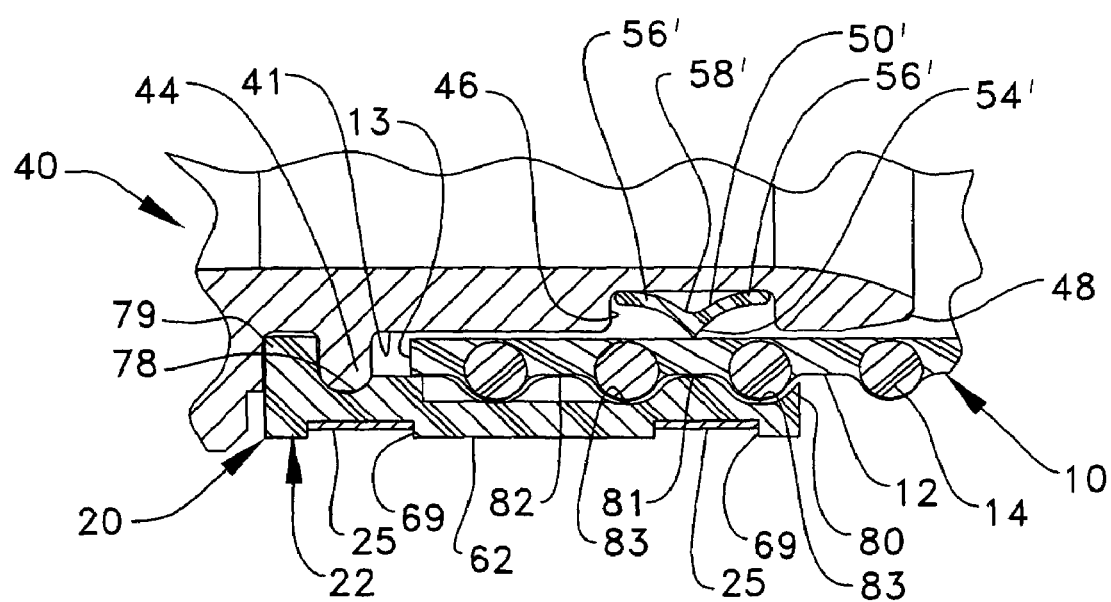
FIG. 18 is an enlarged cross-sectional view of the seal depicted in FIGS. 16-17 mounted within a tailpiece with the binding strip assembly mounted thereto.

Returning again to FIG. 7, the engagement surface 60 defines a retainer rib channel 78 adjacent one edge of the binding strip 22. The channel 78 is configured to receive the retainer rib 44 of the tailpiece 40 (FIGS. 13-14). Thus, as shown in FIG. 18, the binding strip 22 is configured so that the rib 44 is closely fitted within the channel 78 when the strip is wrapped around the hose and tailpiece. As shown in FIG. 18, the edge 13 of the hose body 12 is offset from the rib 44 when the tailpiece insertion end 48 is pushed into the hose 10. Thus, the interface between the rib 44 and the channel 78 in the binding strip helps index the position of the strip relative to the hose. In addition, this interface helps prevent the binding strip from migrating down the length of the hose or spiraling along the helical bead 14. The binding strip 22 is further configured to incorporate a raised rib 79 immediately outboard of the channel 78. This raised rib engages the outboard face of the retainer rib 44 of the tailpiece 40 to further ensure that the binding strip 22 will not disengage the tailpiece.

Figure 7:
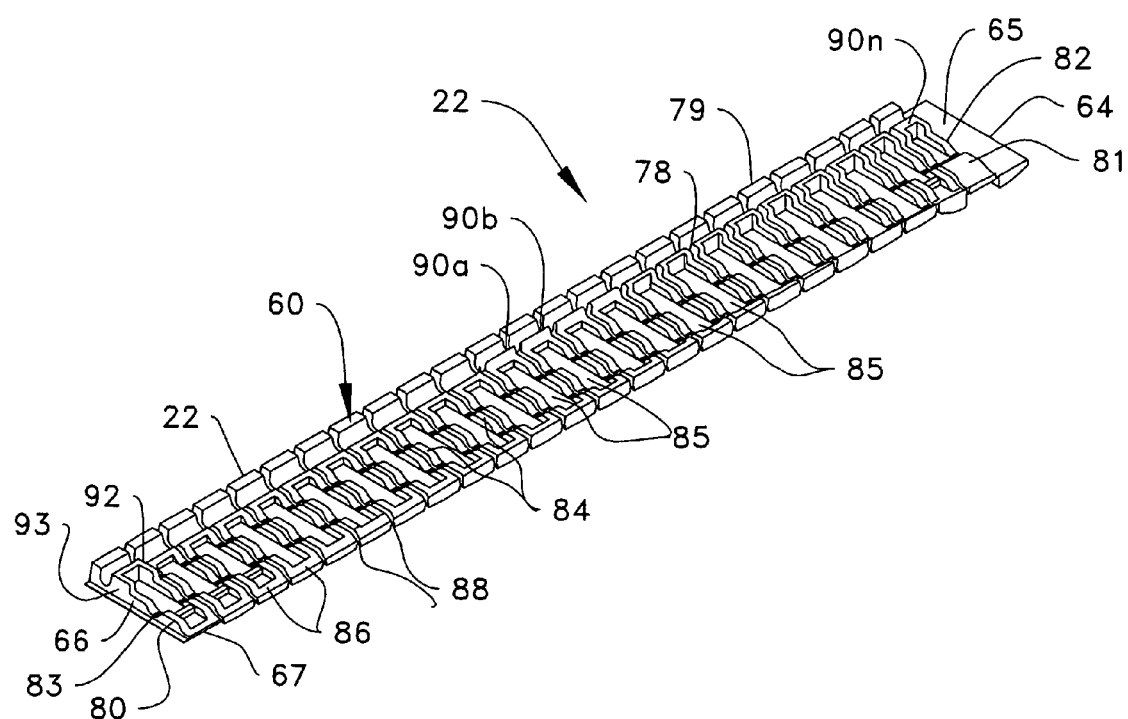
FIG. 7 is a perspective view of the hose engagement side of a binding strip forming part of the binding strip assembly depicted in FIGS. 1-6.
Figure 9:
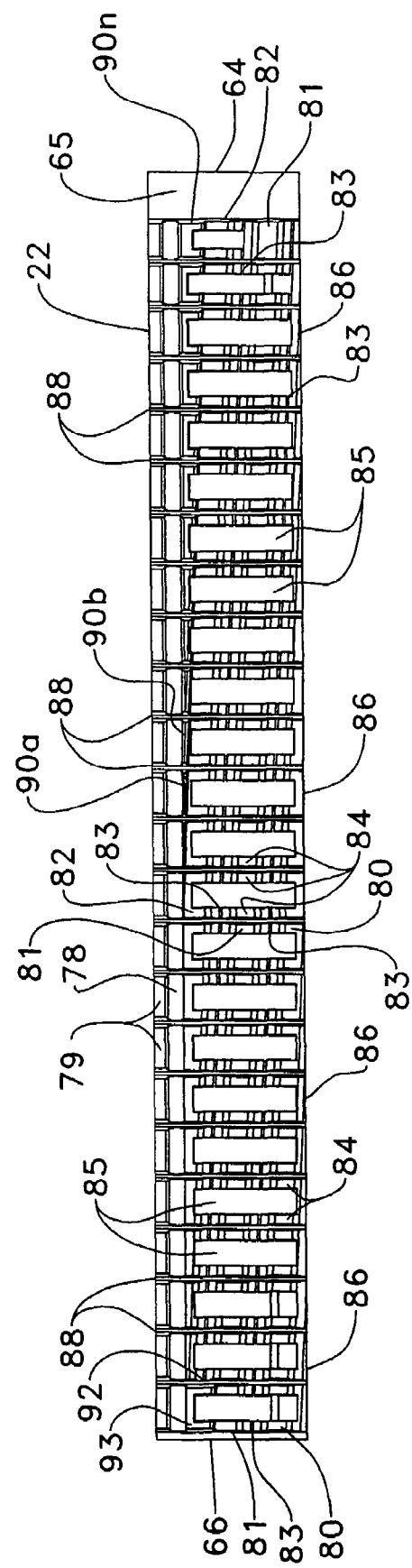
FIG. 9 is a top elevational view of the hose engagement side of the binding strip shown in FIG. 8.
Figure 11:
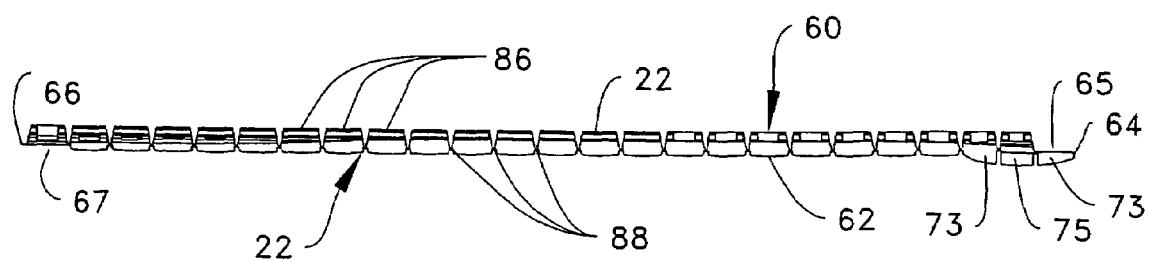
FIG. 11 is a side elevational view of the binding strip illustrated in FIG. 7.

In order to accommodate the helical bead 14 of the spiral bead hose, the engagement surface 60 defines a series of clamping tracks 80, 81 and 82 that traverse some portion of the length of the binding strip between the ends 64 and 66, as shown in FIGS. 7 and 9. The tracks 80-82 are arranged at an angle relative to the longitudinal axis of the binding strip. More specifically, the tracks are arranged at an angle that corresponds to the helical angle of the bead 14 on the hose 10. In addition, the tracks 80-82 are separated (width-wise) by a distance equivalent to the "pitch" of the helical bead 14, or by a distance equivalent to the distance between thread segments of the bead. A bead groove 83 is formed between adjacent pairs of the tracks—i.e., between tracks 80 and 81 and between tracks 81 and 82. These grooves 83 are configured to receive the helical bead 14 of the hose 10 while the tracks 80-82 are in contact with the body 12 of the hose.

In the preferred embodiment, the clamping tracks 80-82 are formed by a plurality of ribs 84 that run width-wise across the binding strip 22. The ribs are contoured to form an appropriate portion of each of the clamping tracks 80-82 and bead grooves 83. In other words, a rib 84 at the center portion of the binding strip shown in FIG. 7 or 9 will have a raised portion for each of the tracks 80, 81 and 82, as well as a pair of indented portions between pairs of tracks corresponding to the bead grooves 83.

The ribs 84 are spaced apart to define cavities 85 therebetween. In one aspect of this feature, the cavities 85 reduce the material requirements for the molded binding strip. In use, the cavities 85 provide a space for the hose body 12 to bulge when the hose 10 is compressed by the ribs 84 of clamping tracks 80. Moreover, the presence of discrete ribs increases the resistance of the hose to unscrew from the binding strip under external forces.

In another feature of the preferred embodiment of the invention is that the binding strip 22 is articulated so that it can be folded or wrapped around the cylindrical hose, as shown in FIGS. 3, 7, 9 and 11. Thus, the strip includes hinge segments 88 between adjacent rib segments 86. Each hinge segment 88 is preferably in the form of a molded web of reduced material thickness between the rib segments. The web must be thick enough to resist tearing or fracture when the binding strip is bent around a hose, but thin enough to permit the bending. In a specific embodiment, the hinge segments have a web thickness of about 0.030 inches, while the ribs have a minimum thickness (or height) of about 0.300 inches. The hinge webs extend across the entire width of the strip.

The hinge segments 88 allow the rib segments 86 to be generally rigid so that the segments can generate sufficient pressure against the hose to hold the binding strip on the hose, even when the spiral bead hose is pressurized beyond its maximum working pressure (typically about 30 psi). In order to ensure uniform distribution of the clamping force exerted by the binding strip, the rib segments 86 preferably span a circumferential distance of about ¾ inches between hinge segments 88. Thus, the number of rib and hinge segments for a given binding strip depends upon the diameter (or circumference) of the hose onto which the binding clamp is engaged.

For a six inch I.D. spiral bead hose, the binding strip preferably includes 24 rib segments and 23 hinge segments.

It can of course be appreciated that unless the bead 14 is positioned within the bead grooves 83, the binding strip 22 cannot adequately perform its function of securing a coupling or fitting to the spiral bead hose. Thus, in addition to the retaining rib channel 78, the binding strip includes additional features to index the strip or establish its position relative to the helical bead 14 of the spiral bead hose 10. One feature is a plurality of edge indexing ribs 90a-90n. These ribs are aligned parallel to the longitudinal axis of the strip and increase in transverse dimension the closer the indexing rib is to the overlapping end 64 of the strip 22. Thus, as seen in FIGS. 7 and 9, the first indexing rib 90a has a minimal dimension, while the next adjacent rib 90b is slightly larger, up to the largest rib 90n at the end of the strip.

The location and dimension of the indexing ribs are configured to generally follow the contour of the body edge 13. When the spiral bead hose 10 is cut to length, the body edge 13 follows the line of the end bead. It is this line that the indexing ribs 90a-n use to index the rotational position of the binding strip 22 when it is wrapped around the hose. The height of the ribs 90a-n beyond the rib segments 86 is approximately equal to the thickness of the body 12 of the hose 10.

Figure 6:
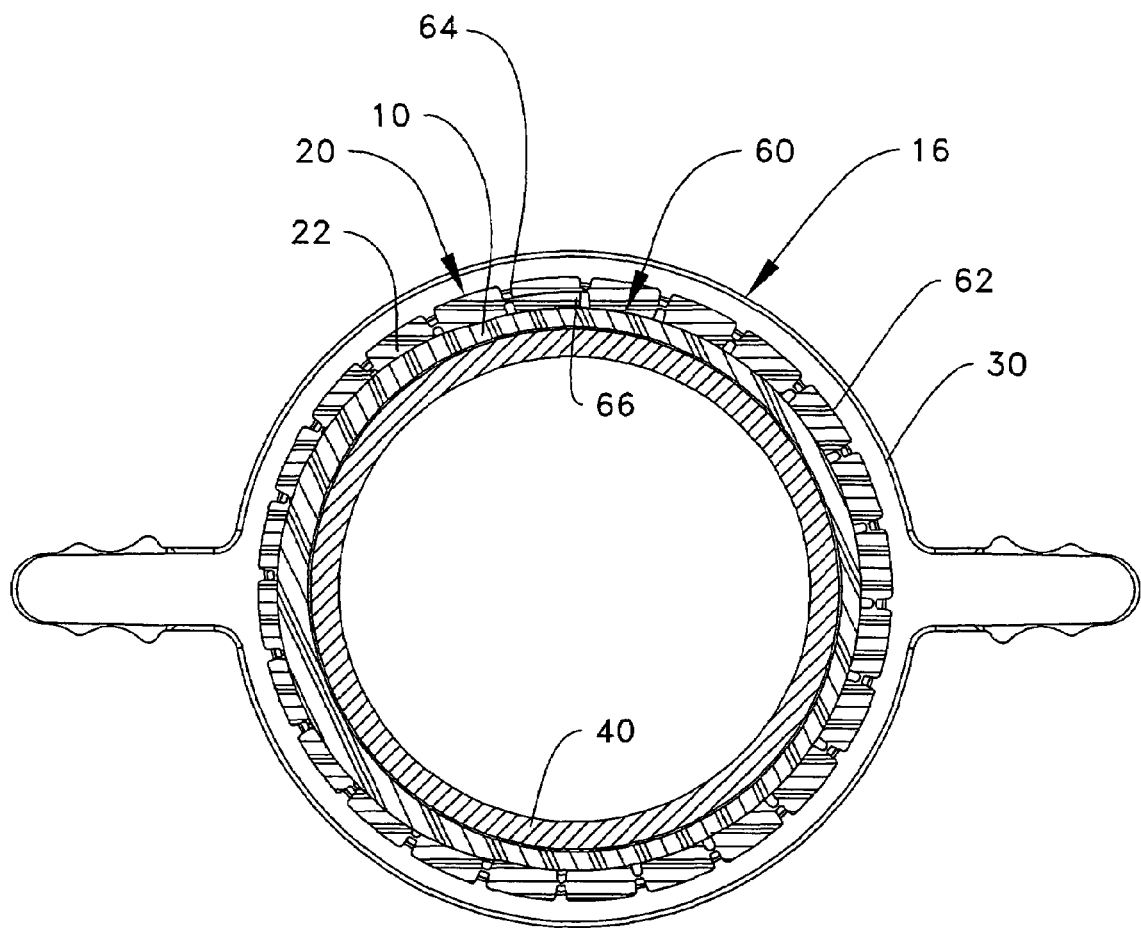
FIG. 6 is an end partial cross-sectional view of the end of the spiral bead hose shown in FIG. 4.

Another indexing feature works off the cut end 92 of the helical bead, as depicted in FIG. 12. The binding strip includes an end rib segment 93 at the overlapped end 66 of the strip 22. Like the indexing ribs 90a-n, this rib segment 93 has a height above the other rib segments that is approximately equal to the hose body thickness. As shown in FIG. 12, the binding strip may be initially placed in contact with the hose so that the end rib segment 93 contacts the cut end 92 of the bead. From this orientation, the binding strip 22 may then be wrapped around the spiral bead hose until the overlapping edge 64 and surface 65 overlay the overlapped edge 66 and surface 67. When the binding strip 22 is fully wrapped around the hose, as shown in FIG. 6, the band clamps may then be wrapped around the binding strip. Tightening the band clamps uniformly compressed the binding strip 22 against the hose 10, as shown in FIG. 3.

The binding strip 22 of the embodiment just described provides means for securing a fitting or coupling to a spiral bead hose, with virtually no risk of disengagement. The clamping and indexing features ensure that the clamping force is exerted uniformly around the entire circumference of the hose. Moreover, the overlapping end features of the binding strip 22 allow it to accommodate typical manufacturing variations in the outer circumference of the hose. While the binding strip 22 solidly binds or clamps the spiral bead hose to the fitting tailpiece, it is desirable to add an additional feature to ensure that the securement is water-tight.

Figure 16:
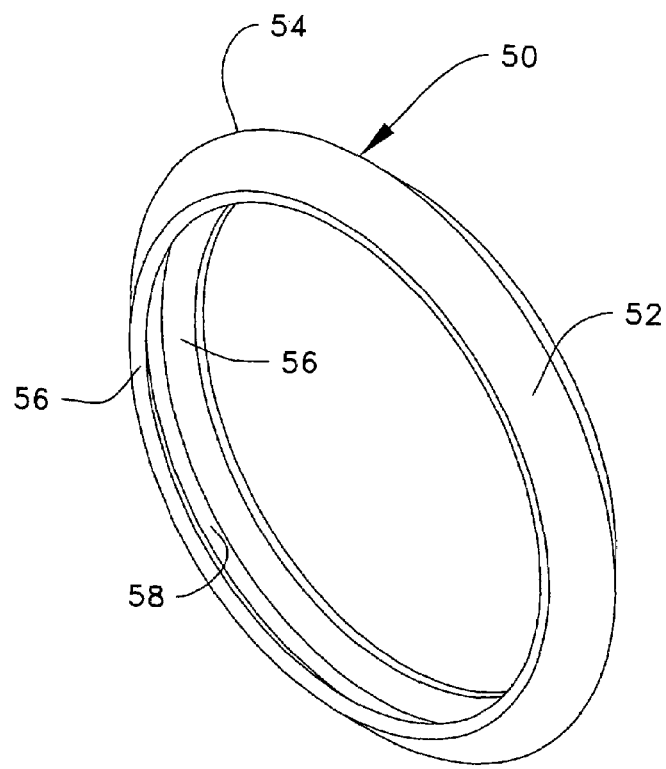
FIG. 16 is an enlarged perspective view of a seal for use with the binding strip assembly in one embodiment of the present invention.
Figure 17:
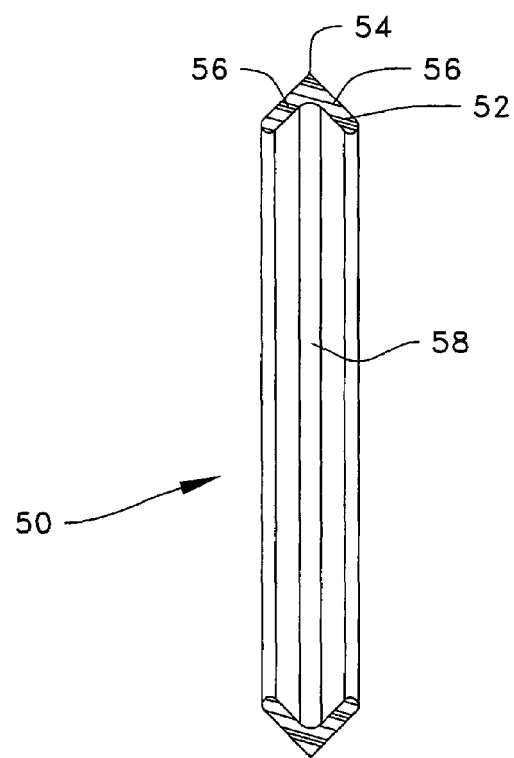
FIG. 17 is a partial cross-sectional view of the seal shown in FIG. 16.

Thus, in a further aspect of the invention, a seal 50 is provided that is positioned between the tailpiece 40 and the inner surface of the spiral bead hose, as illustrated in FIG. 3-5 and 18. As shown in more detail in FIGS. 16-17, the seal 50 is V-shaped in cross-section. The seal 50 includes a body 52 of an elastomeric material, such as rubber, that is adapted to seal against metallic surfaces, such as the tailpiece, and non-metallic surfaces, such as the hose. In a preferred embodiment, the seal is molded from Alcryne® 2080 thermoplastic elastomer produced by the APA division of Ferro Corp. The body 52 includes a pair of wings 56 diverging from an apex 54. The V-shape formed by the wings 56 essentially forms a circumferential cavity around the inside of the seal 50.

As best seen in the enlarged view of FIG. 18, the seal 50 assumes a deformed shape 50' in which the wings 56' are splayed outward within the circumferential groove 46 in the tailpiece 40. The apex 56' is in contact with the inner diameter of the hose 10. In its undeformed shape shown in FIGS. 16-17, the seal 50 has a height from the apex 54 to the end of the wings 56 that is greater than the depth of the circumferential groove 46. Similarly, the width of the undeformed seal between the tips of the wings 56 is less than the width of the groove. Thus, when the seal 50 is contacted by the spiral bead hose as the tailpiece insertion end 48 is pushed into the hose, the hose pushes the apex down to its position 54', which then causes the wings to splay outward to their position 56'. The cavity 58' is similarly shortened.

With the seal 50' in its deformed operative configuration, the apex 54' and wings 56' are in water-tight contact with their respective surfaces. When water begins to flow under pressure through the spiral bead hose, some water may pass around the tailpiece insertion end 48 until it reaches the seal 50'. The water pressure pushes against the apex 54', attempting to unseat the apex from the inside of the hose. However, as the apex 54' shifts slightly under the water pressure, the downstream wing 56' follows while remaining in contact with the tailpiece groove 46. This contact allows the wing 56' to continue to exert an outward spring force on the apex to keep it in contact with the spiral bead hose. In addition, the water pressure acting on the apex is attempting to compress the upstream wing. This force encounters increasing resistance from the upstream wing 56' due to the hoop stress in the circumferential seal 50. Even under back pressure or suction, the seal 50, 50' performs identically to maintain a water-tight seal between the tailpiece and the hose.

Figure 20A:
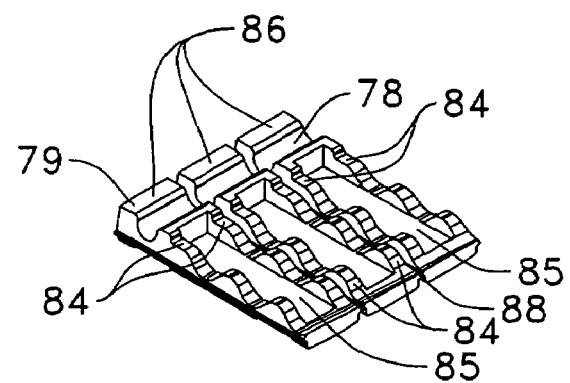
FIGS. 20a-c are perspective views of segments of binding strips in accordance with different embodiments of the invention.
Figure 20B:
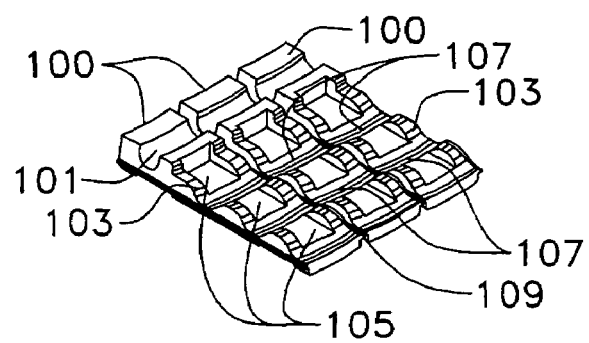
Figure 20C:
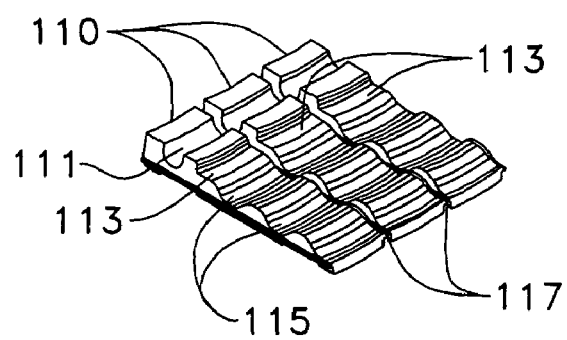

Referring now to FIGS. 20a-c, alternative configurations for the rib segments of the binding strip are depicted. In the version depicted in FIG. 20a, the rib segments 86 include circumferentially offset ribs 84, separated by cavities 85 that are open at one edge of the strip. The hinges 88 connect each the adjacent rib segments.

In the version shown in FIG. 20b, the rib segments 100 include ribs 103 that are similar to the ribs 84. The segments further include the retainer rib channel 101 adjacent one edge of the strip. In this variation, the ribs are separated by discrete cavities 105. Clamping segments 107 span the cavities between ribs 103 so that the portion of the rib segments 100 that engages the hose bead 14 is substantially continuous along the entire length of the binding strip. In this embodiment, the clamping segments are interrupted only by the hinges 109 between rib segments.

In a further variation shown in FIG. 20c, the rib segments 110 include the retainer rib channel 101 and the hinges 117, like the prior embodiments. Unlike the prior versions, the segments 110 incorporate solid ribs 113 without any cavities. The solid ribs are contoured to form the clamping cavities 115 along the length of the binding strip.

Figure 21:
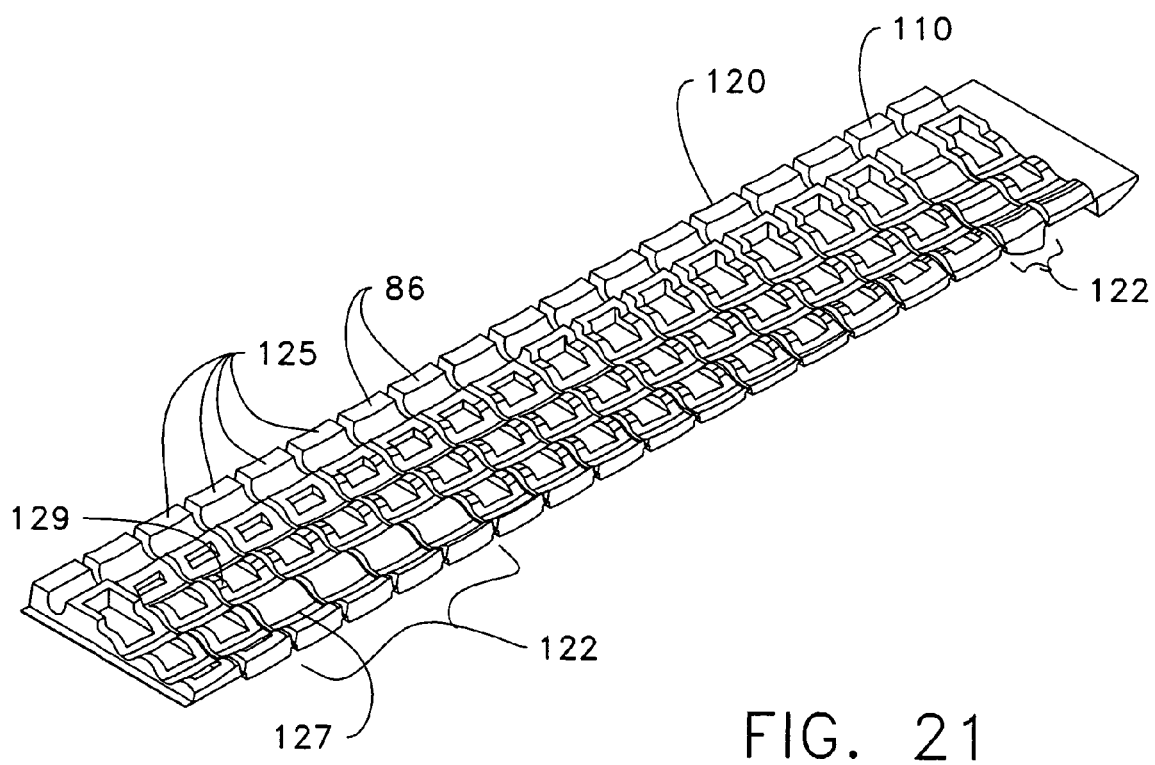
FIG. 21 is a perspective view of the hose engagement side of a binding strip in accordance with a further embodiment of the invention.

The continuous rib concept of the embodiment of FIG. 20c is further modified in the binding strip 120 shown in FIG. 21. In this embodiment, the strip includes regions 122 that overlay the seal 50 when the binding strip is wound around the hose 10 and tailpiece 40. These regions include rib segments 125 that incorporate solid rib portions 127 that fall directly over the seal 50. The solid rib portions give way to portions 129 that incorporate cavities. In the preferred embodiment, at least one of the regions may include a solid rib segment, such as the segments 110 shown in FIG. 20b. In the regions of the binding strip outside the seal overlaying regions 122, the rib segments are preferably configured like the segments 86 (FIG. 20a).

Figure 22A:
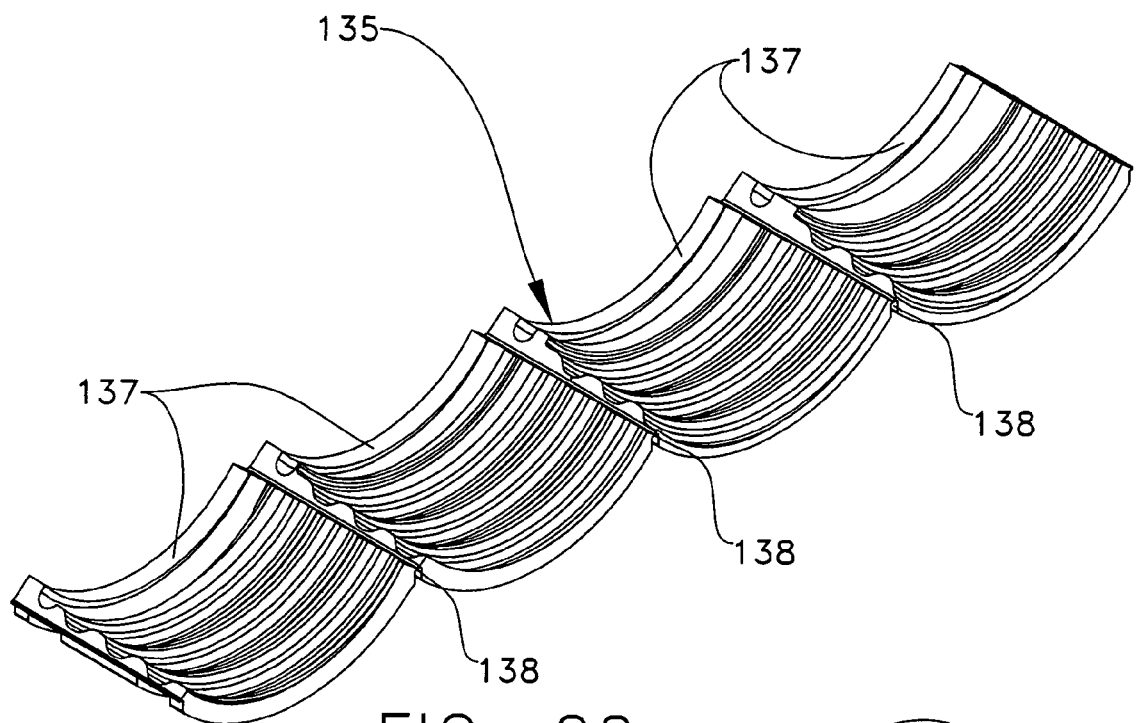
FIGS. 22a-b are perspective views of opposite sides of a segmented binding strip according to another embodiment of the invention.
Figure 22B:
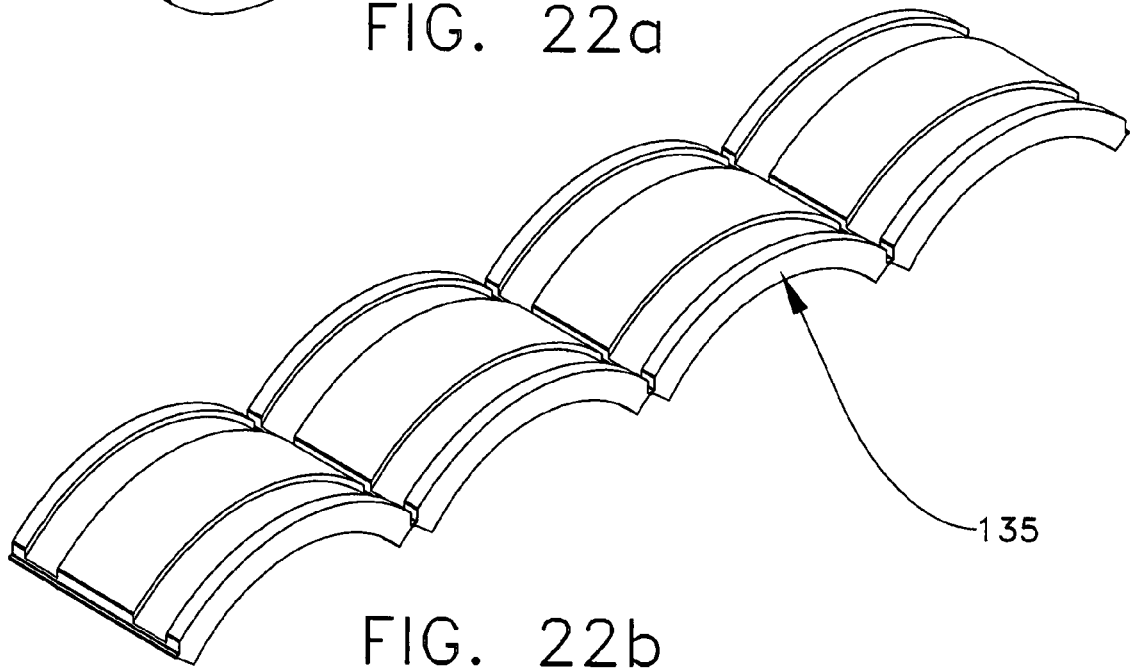

In the preferred embodiment, the binding strip includes several rib segments separated by hinges. In an alternative embodiment, a binding strip 135 includes only four segments 137, as shown in FIGS. 22a-22b. Each segment 137 is in the form of a quarter-circle arc so that when the segments 137 are rotated around the hinges 138 the resulting binding strip completely encircles the hose. With this embodiment, since discrete segments are utilized the binding strip 135 must be accurately sized to the circumference of the hose. Thus, as shown in FIGS. 22a-22b the end-most segments do not necessarily include overlapping and overlapped surface. If the fully formed segments are accurately sized, the end-most segments abut so there is no gap.

Figure 23A:
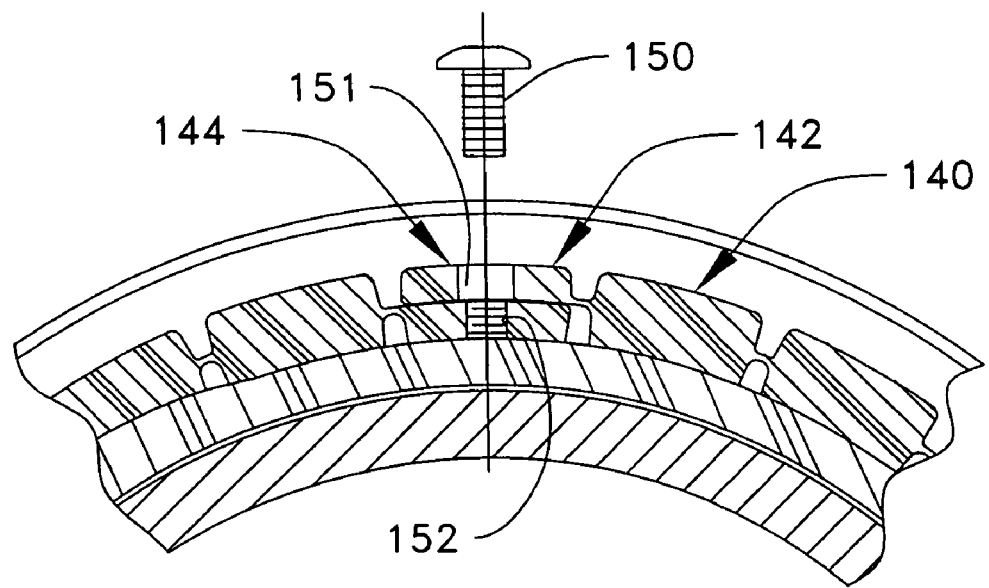
FIGS. 23a-b are end partial cross-sectional views of lap joint portions of a binding strip in alternative embodiments of the invention.
Figure 23B:
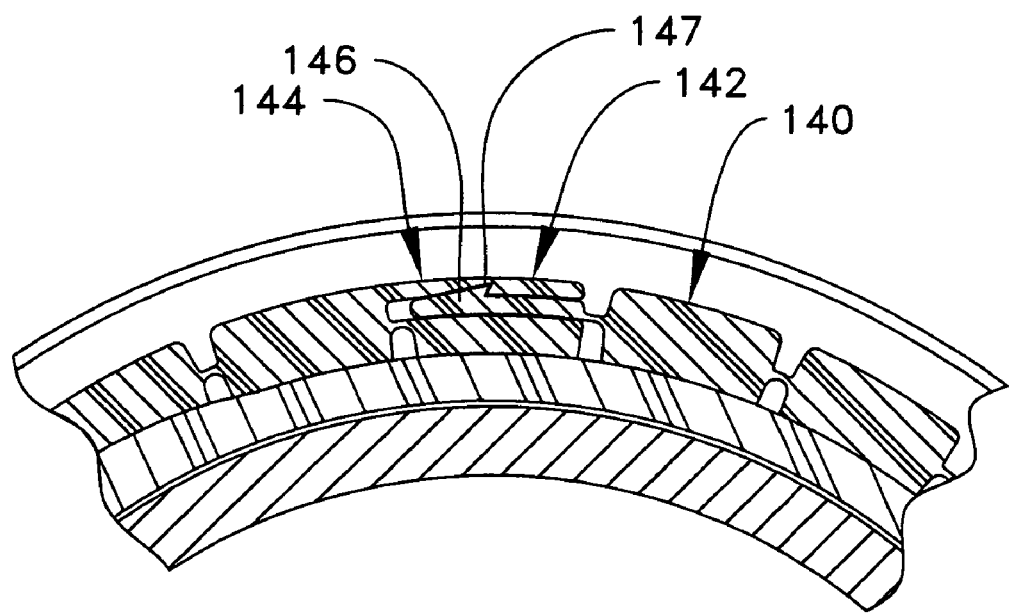

With respect to the overlapping segments, various lap joints are also contemplated for connecting the ends of a binding strip after it is wrapped around a hose. Thus, as shown in FIGS. 23a and 23b, a modified binding strip 140 includes a lap joint 142 with a positive fixation element 144. The positive fixation element differs from the overlapping ends 64, 66 shown in FIG. 19a, for instance, where the overlapping relationship is maintained only by the band clamp 24. In these alternative embodiments, the positive fixation element 144 mechanically connects or interlocks the overlapping and overlapped ends of the binding strip.

Thus, in the version shown in FIG. 23a the element 144 includes a machine screw 150. The screw passes through a bore 151 in the overlapping end and engages a threaded bore 152 in the overlapped end. Alternatively, the element 144 incorporates a snap-fit arrangement. Thus, as shown in FIG. 23b, the positive fixation element 144 may includes a snap-fit finger 146 at one end of the binding strip that interlocks with or snaps into a recess 147 in the opposite end. The finger 146 may be barbed to latch with the recess 147, and may include a series of barbs to permit adjustment of the amount of overlap.

The binding strips described above have been shown in combination with a tailpiece 40 or similarly configured coupling 18 in which the insertion end 48 is in the form of a smooth cylinder, albeit tapered at the end. The binding strip of the present invention may also be used for barbed fittings, such as the modified tailpieces shown in FIGS. 24a-c. The tailpiece 155 in FIG. 24a includes a retainer rib 157, while the tailpiece 165 in FIGS. 24b-c does not. Both tailpieces 155, 165 include barbs 160,168, respectively, on a corresponding collar 159, 167 that are configured to bite into the interior of the hose to prevent dislodgement of the collar from the hose.

Figure 24A:
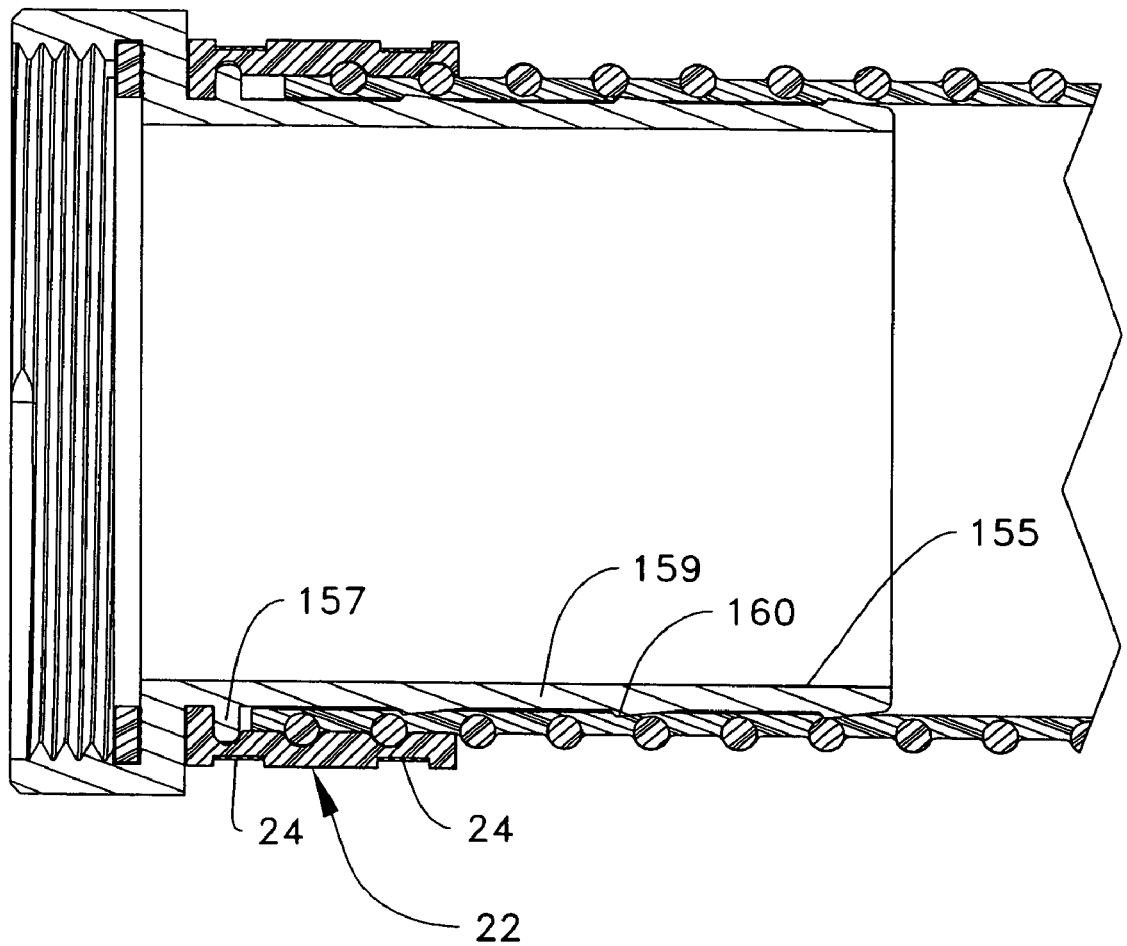
FIGS. 24a-c are side cross-sectional views of alternative tailpiece configurations with modified binding strip assemblies according to other embodiments of the invention.
Figure 24B:
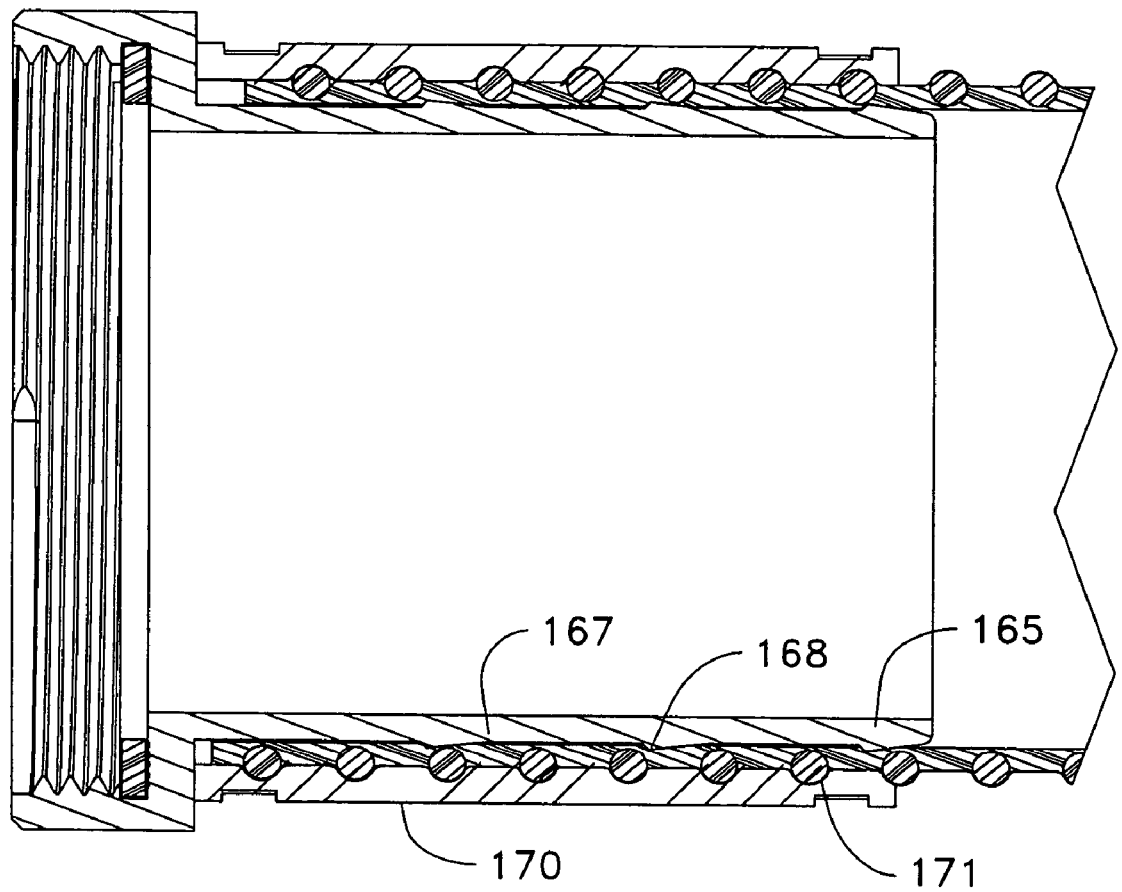

The modified tailpiece 155 of FIG. 24a may accommodate the binding strip 22 described above since it incorporates the retainer rib 157 to help prevent the hose from unwinding relative to the binding strip. The tailpiece 165 does not incorporate the rib, so other features are contemplated to prevent the hose from becoming disconnected. Thus, as shown in FIG. 24b, the binding strip 170 is longer than the binding strips of the prior embodiments. In the prior embodiments, the binding strip includes a pair of bead grooves (i.e., grooves 83 shown in FIG. 7). The binding strip 170 includes eight grooves 171 so that the binding strip is nearly co-extensive with the collar 167.

Figure 24C:
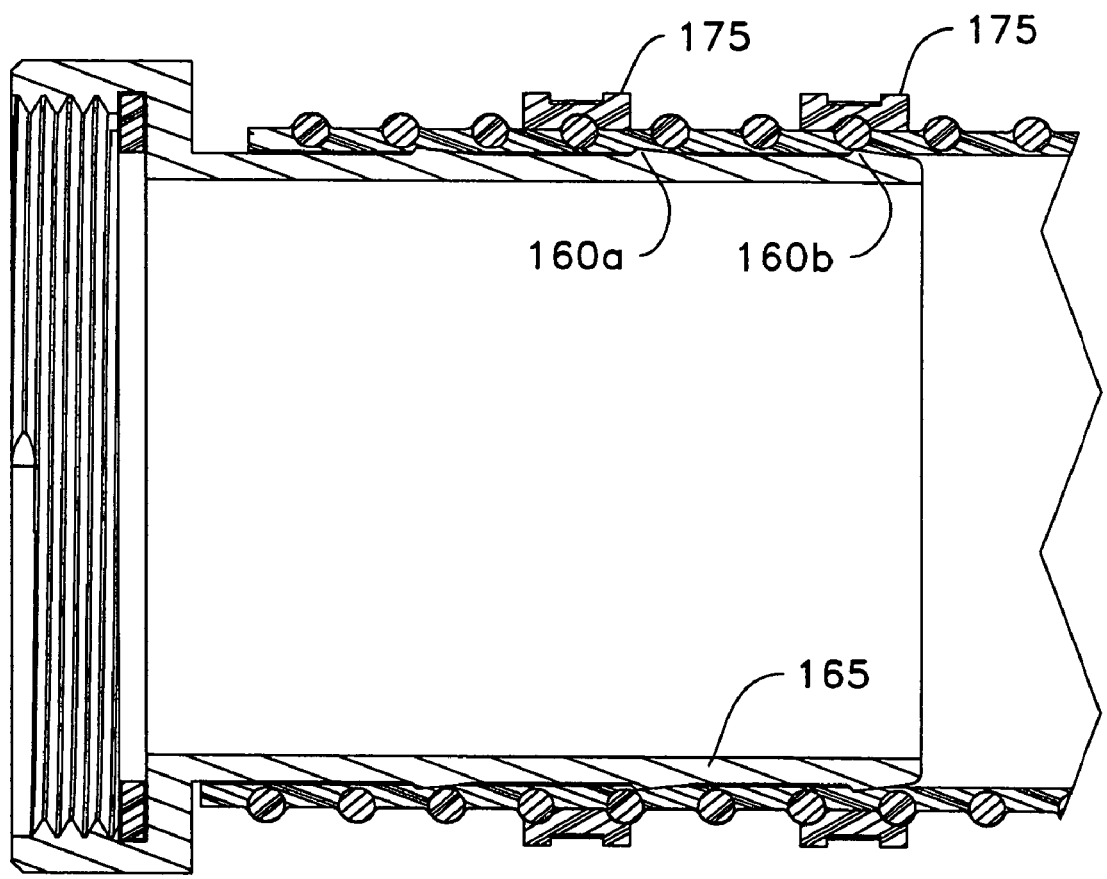

Alternatively, modified binding strips 175 may be provided as shown in FIG. 24c. These modified strips 175 essentially follow a single revolution of the helical bead, as depicted in the figure. With this approach, the binding strips are preferably arranged to be situated upstream of one barb 160a and overlapping another barb 160b. The binding strip 175 adjacent the barb 160a compressed the binding hose material upstream of the barb 160a so the barb resists dislocation of the hose. With respect to the second barb 160b, the tightened binding strip 175 essentially impales part of the hose bead on the barb.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

Thus, in the illustrated embodiments, the spiral bead hose 10 is intended for use as a fire hose. However, spiral bead hoses are also used for moving various liquids in various different suction applications. For instance, the spiral bead hose 10 may be used for dewatering pumps, liquid waste removal and septic applications. In low-pressure delivery or gravity feed applications, the spiral bead hose may be used to convey water, fertilizer, gasoline, kerosene and heavy oil. Spiral bead hose may also be used in various pneumatic conveying applications, such as for moving plastic pellets, sawdust, grain, mulch, cotton, pea gravel and grass clipping. In each application, it is important that hose not dislodge or disconnect from the fitting or coupling. In some of the applications, a fluid-tight seal is important. In either case, the binding strips of the present invention fulfill these functional requirements.

What is claimed is:

1. An apparatus for securing a fitting or coupling to a hose having a spiral or helical bead on its outer surface, the fitting or coupling having a cylindrical portion configured for insertion into the end of the hose, said apparatus comprising:
   an elongated binding strip having an inner surface for contacting the hose and an opposite outer surface, said outer surface defining at least one groove along the length of said strip,
   said inner surface including a plurality of rib segments, adjacent ones of said rib segments connected by a hinge segment so that said rib segments bend about said hinge segments when said binding strip is wrapped around the hose; and
   at least one tension element configured to be wrapped around said binding strip within said at least one groove when said binding strip is wrapped around the hose.

2. The apparatus of claim 1, wherein said at least one tension element is a band clamp.

3. The apparatus of claim 2, wherein;
   said band clamp includes a tension band and a buckle; and
   said outer surface of said binding strip includes a recess for receiving said buckle therein when said tension band is wrapped around said binding strip.

4. The apparatus of claim 3, wherein said outer surface defines upstanding ribs adjacent said recess substantially surrounding said buckle when said buckle is within said recess.

5. The apparatus of claim 1, wherein at least some of said plurality of rib segments includes opposite ribs extending transversely across said binding strip, whereby said ribs contact the hose when said binding strip is wrapped therearound.

6. The apparatus of claim 5, wherein said plurality of rib segments define at least one groove configured to receive the spiral bead of the hose therein when said binding strip is wrapped around the hose.

7. The apparatus of claim 6, wherein said at least one groove is arranged at an angle relative to the length and transverse dimension of said binding strip to correspond to the spiral configuration of the bead on the hose.

8. The apparatus of claim 5, wherein said at least some of said plurality of rib segments includes at least one cavity defined between said opposite ribs.

9. The apparatus of claim 8, wherein said at least one cavity includes only one cavity between said opposite ribs.

10. The apparatus of claim 9, wherein said at least one cavity is open at one edge of said binding strip.

11. The apparatus of claim 8, wherein said plurality of rib segments define at least one groove configured to receive the spiral bead of the hose therein when said binding strip is wrapped around the hose.

12. The apparatus of claim 11, wherein said at least one cavity includes a cavity on both sides of said at least one groove.

13. The apparatus of claim 1, wherein an endmost one of said rib segments includes an enlarged rib configured to engage a cut end of the spiral bead of the hose.

14. The apparatus of claim 1, wherein said binding strip defines a channel extending along the length of said binding strip through each of said plurality of rib segments, said channel configured to receive a retainer rib formed in the fitting or coupling when said binding strip is wrapped simultaneously around the hose and a portion of the fitting or coupling.

15. The apparatus of claim 1, wherein said binding strip includes opposite ends configured to overlap when said binding strip is wrapped around the hose.

16. The apparatus of claim 15, wherein said opposite ends include substantially flat facing surfaces when the opposite ends are overlapped.

17. The apparatus of claim 16, wherein said binding strip includes a positive fixation element between said facing surfaces at said opposite ends thereof.

18. The apparatus of claim 17, wherein said positive fixation element includes:
   a screw;
   a screw bore through one of said opposite ends for passage of said machine screw therethrough; and
   a threaded bore defined in the other of said opposite ends configured to threadedly receive said machine screw.

19. The apparatus of claim 17, wherein said positive fixation element includes a snap-fit arrangement between said opposite ends.

20. The apparatus of claim 1, wherein said binding strip is molded from plastic.

21. The apparatus of claim 1, wherein said binding strip includes indexing ribs defined in only some of said plurality of rib segments, said indexing ribs configured to contact the edge of the hose.

22. The apparatus of claim 1, wherein said binding strip includes at least three arc segments that combine to form an enclosed cylinder.

23. The apparatus of claim 1, further comprising:
   a groove defined in the cylindrical portion of the fitting or coupling, said groove having a depth and a width;
   a V-shaped circumferential seal configured to fit within said groove, said seal having an undeformed width less than said width of said groove and an undeformed height greater than said height of said groove, said seal deformable when said cylindrical portion is inserted into the end of the hose so that said seal has a deformed width greater than said undeformed width and a deformed height less than said undeformed height.

24. The apparatus of claim 23, wherein said seal is deformable so that said deformed width equals said width of said groove.

25. A binding strip for securing a fitting or coupling to a hose having a spiral or helical bead on its outer surface, the fitting or coupling having a cylindrical portion configured for insertion into the end of the hose, said binding strip comprising:
   an elongated body having an inner surface for contacting the hose and an opposite outer surface, said outer surface defining at least one groove along the length of said strip configured to receive a band clamp,
   said inner surface including a plurality of rib segments, adjacent ones of said rib segments connected by a hinge segment so that said rib segments bend about said hinge segments when said binding strip is wrapped around the hose,
   wherein said elongated body defines a channel extending along the length of said body through each of said plurality of rib segments, said channel configured to receive a retainer rib formed in the fitting or coupling when said binding strip is wrapped simultaneously around the hose and a portion of the fitting or coupling.

26. The apparatus of claim 25, wherein at least some of said plurality of rib segments includes opposite ribs extending transversely across said elongate body, whereby said ribs contact the hose when said binding strip is wrapped therearound.

27. The apparatus of claim 25, wherein said plurality of rib segments define at least one groove configured to receive the spiral bead of the hose therein when said binding strip is wrapped around the hose.

28. The apparatus of claim 27, wherein said at least one groove is arranged at an angle relative to the length and transverse dimension of said elongated body to correspond to the spiral configuration of the bead on the hose.

29. The apparatus of claim 26, wherein said at least some of said plurality of rib segments includes at least one cavity defined between said opposite ribs.

30. The apparatus of claim 29, wherein said at least one cavity includes only one cavity between said opposite ribs.

31. The apparatus of claim 29, wherein said plurality of rib segments define at least one groove configured to receive the spiral bead of the hose therein when said binding strip is wrapped around the hose.

32. The apparatus of claim 31, wherein said at least one cavity includes a cavity on both sides of said at least one groove.

33. The apparatus of claim 25, wherein an endmost one of said rib segments includes an enlarged rib configured to engage a cut end of the spiral bead of the hose.

34. The apparatus of claim 25, wherein said elongated body includes opposite ends configured to overlap when said binding strip is wrapped around the hose.

35. The apparatus of claim 34, wherein said opposite ends include substantially flat facing surfaces when the opposite ends are overlapped.

36. The apparatus of claim 25, wherein said binding strip is molded from plastic.

37. The apparatus of claim 25, wherein said elongated body includes indexing ribs defined in only some of said plurality of rib segments, said indexing ribs configured to contact the edge of the hose.

* * * * *